2,647,823

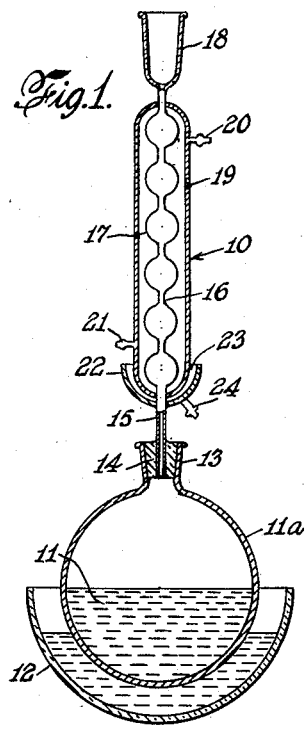
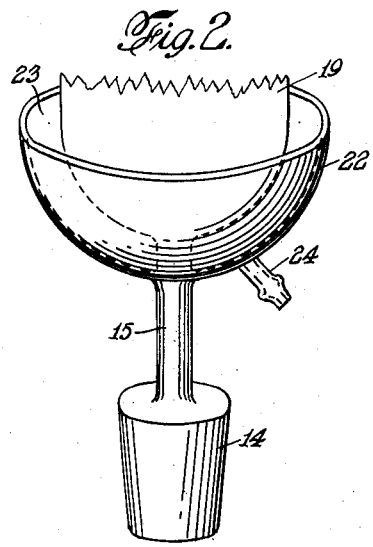
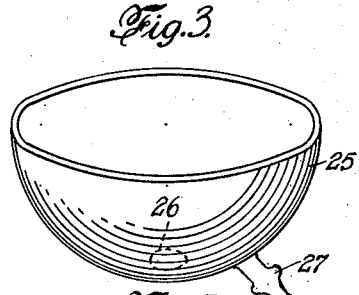
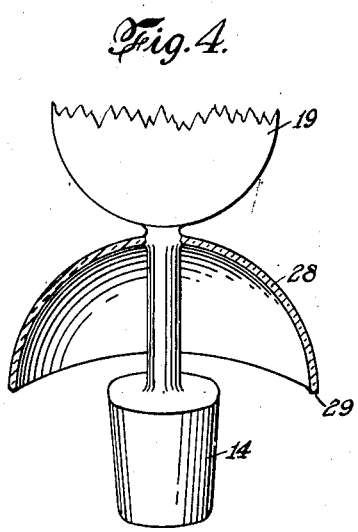
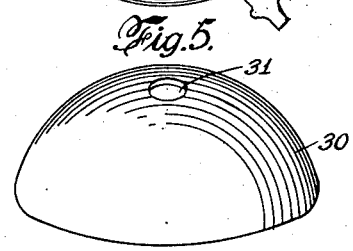
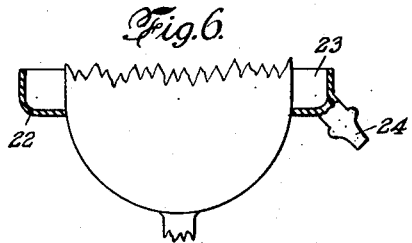
INVENTORS
GIJSBERTUS C. VAN WESSEM
AND ERNST H. KASTNING
BY
ATTORNEYS Patented Aug. 4, 1953

UNITED STATES PATENT OFFICE 2,647,823

CONDENSING APPARATUS

Gijsbertus C. van Wessem, Harrison, and Ernst H. Kastning, Poundridge, N. Y.

Application June 17, 1949, Serial No. 99,642

1 Claim. (Cl. 23—259)

This invention relates to improvements in condensers, more particularly of the type used as standard equipment in laboratories for carrying out chemical experimentation and analyses. Ordinary glass condensers of the aforementioned variety are commonly employed in the distillation of organic liquids into the component fractions and for refluxing liquid reaction constituents during a chemical process requiring heat. Such condensers are usually formed with a central tube through which the hot reaction liquors surge and fluctuate surrounded by a jacket for the circulation of a cooling liquid. The lower end of the central tube terminates in a stem which communicates with the hot liquids through a ground glass connection or sometimes a rubber or cork stopper situated in the mouth of the reaction flask. For distilling operations the stem of the condenser tube forms the outlet into a receiver for collecting distillate fractions.

A disadvantage encountered in the use of water cooled condensers of the aforementioned type is the tendency of atmospheric condensation occurring on the outer surfaces of the condenser to seep through the tapered joint between the stopper and the container mouth or, in the case of rubber and cork stoppers, the joint between the stem and the stopper opening and contaminate the contents of the reaction flask or the distillate fractions. This condensation is especially pronounced in humid atmospheres and where steam baths are employed as a part of the processing equipment.

Since the course of many chemical reactions is greatly influenced by the presence of contaminants in the reaction mixture, the object of maintaining the chemical reactants in an environment substantially free of foreign material is a matter of critical importance. Moreover, the technical requirements of analytical determinations and fractionating procedures demand the complete exclusion of contaminating influences in the realm of the liquids being treated.

It is a primary object of the present invention to provide means for insuring the technical accuracy of chemical methods and for the exclusion of atmospheric condensate from the contamination of reaction mixtures and distillates in the use of laboratory equipment.

According to our invention, we provide means in combination with a laboratory or other condenser for deflecting atmospheric condensate from the condenser stem and removing the liquid condensate from the area of the equipment where condensation or dilution of the chemical liquids could occur.

Preferably we provide means in the form of a flange or mantle surrounding the condenser stem which may either be molded or blown as an integral part of the condenser itself or alternatively be in the form of an accessory readily adaptable to an existing condenser and which may be easily fitted or adapted to the stem in such a manner that the condensate collecting on the exterior surfaces of the condenser and accumulating on the condenser stem is carried away therefrom. In one embodiment of the invention our deflector may be in the form of a cup-like gutter surrounding the condenser stem so that the water of condensation collects in the gutter and flows away from the condenser stem through an outlet appended to the side of the cup-like member. In a further embodiment of the invention our deflector may be in the form of a semispherical member surrounding the condenser stem in the manner of an umbrella so that the collected moisture flows downwardly over the outer periphery of the semispherical member away from the joints and connections between the condenser and the reaction flask. These illustrate a few of the preferred devices for accomplishing the purposes of the invention and it is apparent that these illustrative embodiments may be varied considerably without departing from the spirit and scope of the invention as defined in the accompanying claim.

Referring to the drawings, Fig. 1 illustrates our invention applied to a reflux condenser of a conventional type.

Fig. 2 is an enlarged sectional detail of the deflector and lower part of the condenser illustrated in Fig. 1.

Fig. 3 shows diagrammatically a modified form of deflector adapted for use with existing condensers.

Fig. 4 shows a modified type of deflector formed integral with a condenser unit.

Fig. 5 shows a similar type of deflector as the one in Fig. 4 which is separable and may be used as an accessory to existing equipment.

Figure 6 shows the deflector adjacent the bottom of the cooling jackets.

In the drawings the numeral 10 designates in general a water cooled condenser of the reflux type used in bringing about certain types of organic chemical reactions. In this form of apparatus the chemical reactants 11 usually in a liquid medium are placed in a reaction vessel 11a and heated over a suitable water bath 12 or other heating unit in accordance with conventional procedure. The mouth 13 of the reaction vessel is closed by a stopper 14 integral with the stem 15 or formed of cork, rubber or other material having an opening for the stem 15 of the central tube 16 of the reflux condenser 10. Enlargements 17 are formed in the tube 16 to increase the cooling area. For refluxing operations the upper joint 18 of the central tube 16 communicates with the atmosphere to enable the reaction to proceed at normal pressure or may be connected with suitable apparatus for conducting the reaction at increased or reduced pressure. As the hot liquid reaction mixture surges and refluxes in the central tube 16 of the condenser 10 it is subjected to a cooling medium circulating through a jacket 19 surrounding the central tube 16 and provided with inlet and outlet connections 20 and 21.

As the reaction progresses atmospheric moisture condenses in small droplets on the exterior surfaces of the cooling jacket 19 and runs down the side of the jacket toward the joints and connections between the condenser and the reaction flask to normally contaminate the reaction mixture within the vessel 11. In accordance with the present invention this condensate is carried away from the mouth of the reaction vessel by the provision of a deflector which may be in the form of a semispherical cup 22 on the stem 15 of the condenser providing a gutter 23 in which the condensate collects and is diverted from the stem 15 through an outlet 24 thereby precluding the contamination and dilution of the reaction mixture 11. In using the condenser 10 for distilling operations the deflector also prevents contamination of the condensed gaseous fractions passing through the outlet stem 15 into the receiver.

The deflector cup 22 may be cast, fused or molded integrally with the outlet stem 15 in the manufacture of the condenser or may be made as an accessory readily adaptable to existing condensers as shown in Fig. 3 of the drawing. In this embodiment I have shown a cup shaped member 25 preferably formed of soft rubber or other flexible material having a thickened portion at the bottom and an opening 26 for the reception of the condenser stem 15 as will be readily apparent. An outlet 27 is provided for carrying liquid collecting in the cup away from the receiver. A modified form of deflector is shown in Fig. 4 where an inverted semisphere 28 is cast or fused on the condenser stem 15 in a manner such that atmospheric condensate flows down the outer surface of the deflector and over the periphery 29 which is concentrically disposed beyond the area of the stopper and stem joints as will be readily apparent. A modified form of umbrella deflector is shown in Fig. 5 wherein a flexible rubber cup 30 having a central opening 31 is provided which can be merely slipped over the stem outlet of a conventional type of condenser in a similar manner to the device shown in Fig. 3. These and other modifications and changes may be made without departing from the essential features and concept of the invention as defined in the appended claim.

We claim:

In combination with a condenser having a central tube removably connected through a stopper with the mouth of a reaction vessel and an elongated cooling jacket externally surrounding said tube for the reception of a cooling medium for cooling and condensing hot liquids and gases surging through the tube from the reaction vessel and whereupon atmospheric condensation tends to occur and contaminate the contents of the reaction vessel, an integral concentric cup-like member disposed near the lower end of the condenser adjacent the reaction vessel and shaped to conform to the external configuration of the condenser, said cup-like member being so disposed with respect to the cooling jacket that substantially all atmospheric condensate forming on the external surfaces of said cooling jacket are directed into and collected by the said cup-like member, a drain near the lower portion of the cup-like member extending beyond the area of the stopper connections and mouth of the reaction vessel so that said atmospheric condensate is conveyed thereby away from the reaction vessel and contamination thereof effectively avoided.

GIJSBERTUS C. van WESSEM.
ERNST H. KASTNING.

References Cited in the file of this patent

UNITED STATES PATENTS

| Number | Name | Date |
|---|---|---|
| 158,924 | Faure et al. | Jan. 19, 1875 |
| 454,778 | Swartz | June 23, 1891 |
| 2,308,293 | Maude | Jan. 12, 1943 |
| 2,403,902 | Bell et al. | July 16, 1946 |

FOREIGN PATENTS

| Number | Country | Date |
|---|---|---|
| 314,923 | Great Britain | July 2, 1929 |
| 672,145 | France | Mar. 27, 1929 |
| 270,533 | Germany | May 11, 1913 |

OTHER REFERENCES

Sharp and Struble "Ind. and Eng. Chem., Anal. Ed." vol. 8, No. 4, July 15, 1936, page 316.

Fisher "Modern Laboratory Appliances" Copyright 1942, page 400 Item 9–122, Publ. by Fisher Scientific Co., Pittsburgh, Pa. and Eimer and Amend, N. Y. C.